(12) United States Patent
Huke et al.

(10) Patent No.: US 11,676,443 B2
(45) Date of Patent: Jun. 13, 2023

(54) METHOD OF USING VIDEO AND AI IN WAGERING

(71) Applicant: AdrenalineIP, Washington, DC (US)

(72) Inventors: Casey Alexander Huke, Washington, DC (US); Michael D'Andrea, Burlington, VT (US)

(73) Assignee: ADRENALINEIP, Washington, DC (US)

( * ) Notice: Subject to any disclaimer, the term of this patent is extended or adjusted under 35 U.S.C. 154(b) by 399 days.

(21) Appl. No.: 17/091,634

(22) Filed: Nov. 6, 2020

(65) Prior Publication Data

US 2022/0092914 A1 Mar. 24, 2022

Related U.S. Application Data

(60) Provisional application No. 63/081,581, filed on Sep. 22, 2020.

(51) Int. Cl.
*G07F 17/00* (2006.01)
*G07F 17/32* (2006.01)
*G06N 20/00* (2019.01)
*G06Q 50/34* (2012.01)

(52) U.S. Cl.
CPC ......... *G07F 17/3211* (2013.01); *G06N 20/00* (2019.01); *G06Q 50/34* (2013.01); *G07F 17/3288* (2013.01)

(58) Field of Classification Search
None
See application file for complete search history.

(56) References Cited

U.S. PATENT DOCUMENTS

| 2005/0035550 | A1* | 2/2005 | Jackson | G07F 17/3297 273/292 |
| 2007/0142108 | A1* | 6/2007 | Linard | A63F 9/18 463/22 |
| 2008/0229352 | A1* | 9/2008 | Pino | H04N 21/2543 348/E7.071 |
| 2008/0268929 | A1* | 10/2008 | Billmaier | G07F 17/3276 463/4 |
| 2008/0287183 | A1* | 11/2008 | Reeves, III | G07F 17/38 463/25 |
| 2009/0111572 | A1* | 4/2009 | Bigelow, Jr. | G07F 17/3244 463/40 |
| 2012/0094737 | A1* | 4/2012 | Barclay | G07F 17/34 463/43 |

(Continued)

FOREIGN PATENT DOCUMENTS

WO 2019/244151 A1 12/2019

OTHER PUBLICATIONS

Tharindu Fernando et al., "Memory Augmented Deep Generative models for Forecasting the Next Shot Location in Tennis", IEEE Transactions on Knowledge and Data Engineering, arXiv:1901.05123v1 [cs.LG] Jan. 16, 2019, pp. 1-14.

(Continued)

*Primary Examiner* — Paul A D'Agostino
(74) *Attorney, Agent, or Firm* — Maier & Maier, PLLC

(57) ABSTRACT

A system and method for utilizing video analysis to enhance in-play sports wagering by overlaying potential play outcomes with the live video and adjusting the display of the potential outcomes based on the video analysis of the actual play's outcome.

14 Claims, 4 Drawing Sheets

(56) References Cited

U.S. PATENT DOCUMENTS

| | | | | |
|---|---|---|---|---|
| 2012/0316843 | A1* | 12/2012 | Beno | G06Q 10/0639 |
| | | | | 703/2 |
| 2015/0131845 | A1* | 5/2015 | Forouhar | G06F 16/7837 |
| | | | | 382/100 |
| 2015/0279156 | A1* | 10/2015 | Omar | G07F 17/329 |
| | | | | 463/22 |
| 2015/0287285 | A1* | 10/2015 | Shore | G07F 17/3223 |
| | | | | 463/25 |
| 2015/0375083 | A1* | 12/2015 | Stelfox | A63F 13/828 |
| | | | | 700/91 |
| 2016/0012465 | A1* | 1/2016 | Sharp | G06Q 20/321 |
| | | | | 705/14.17 |
| 2016/0193521 | A1* | 7/2016 | Colony | G06Q 50/34 |
| | | | | 273/317 |
| 2016/0300425 | A1* | 10/2016 | Devaraj | G07F 17/3204 |
| 2016/0300431 | A1* | 10/2016 | Ortiz | G07F 17/3288 |
| 2016/0300432 | A1* | 10/2016 | Devaraj | G07F 17/3225 |
| 2016/0300433 | A1* | 10/2016 | Ortiz | G07F 17/32 |
| 2016/0358406 | A1* | 12/2016 | Daly | H04N 21/4312 |
| 2017/0004358 | A1* | 1/2017 | Bose | G06T 7/251 |
| 2017/0061314 | A1* | 3/2017 | Schnurr | H04N 21/25891 |
| 2017/0230267 | A1* | 8/2017 | Armolavicius | H04L 43/062 |
| 2017/0238055 | A1* | 8/2017 | Chang | H04N 21/4662 |
| | | | | 725/19 |

OTHER PUBLICATIONS

Panna Felsen, "Learning to Predict Human Behavior from Video", Electrical Engineering and Computer Sciences University of California at Berkeley, Technical Report No. UCB/EECS-2019-66, http://www2.eecs.berkeley.edu/Pubs/TechRpts/2019/EECS-2019-66.html, May 17, 2019, 71 pages.

* cited by examiner

| User | Game | Play | Wager | Odds | Predicted Outcome |
|---|---|---|---|---|---|
| Joe Smith | NFL-Chicago at Green Bay | 62 | $10 | +250 | Out Route by WR88 |
| Frank Jones | NFL-Chicago at Green Bay | 62 | $50 | +120 | Post Route by WR88 |
| Susan Robinson | NFL-Chicago at Green Bay | 62 | $100 | +300 | Wheel Route by RB23 |

Fig. 2 ns of the invention. Those of ordinary skill in the
METHOD OF USING VIDEO AND AI IN WAGERING

FIELD

The embodiments are generally related to wagering on paths taken by players or objects inside of individual plays of a sporting event.

BACKGROUND

Current sports betting platforms offer numerous different ways to wager on entire sporting events, or individual aspects or portions of those events. However, they do not currently offer a manner for wagering on the movements of players or objects in the field of play.

While sporting events with many stoppages in play make it easier to have many wagering opportunities in a single game, more fluid sports like soccer or basketball, need wagers that can be adapted to that sport.

When wagering on a sporting event or portion of a sporting event, having the actual result relative to the user's wager is desirable. If the wager is based on the path of player or object in the field of play, there are no current solutions that will compare the projected path to the wagered upon path.

SUMMARY

The embodiments include methods, systems, and apparatuses for using video and artificial intelligence in wagering. One embodiment includes a method for wagering on the path of a player or object in the field of play during a single play of a live event and displaying a probabilistic outcome over video of the live event, including retrieving at least one active live event upon which wagers can be placed on plays occurring inside of that live event, presenting at least one wagering option on a play occurring inside of the live event, selecting a path of at least one player or object in a field of play inside the live event for making at least one wager, making a path wager on the selected path, displaying the selected path over a display of the live event, and comparing movement of players and/or objects in the field of play to historical video of the same players in similar plays from at least one of one or more previous live events and previous movements of the players in the current live event, determining a projected path of the player and/or object, overlaying the projected path of the player and/or object over the live event display, and adjusting display of the overlaid projected path based on a confidence in the projection.

Another embodiment includes a computer implemented method for wagering on the path of a player or object on the field of play during a single play of a live event, including executing on a processor the steps of displaying at least one active live event upon which wagers can be placed on plays occurring inside of that live event, displaying at least one wagering option on a play occurring inside of the live event, displaying a path, on an interface, of at least one player or object in a field of play inside the live event for making at least one wager, displaying a path wager placed on the selected path, displaying the user selected path over a display of the live event, overlaying a projected path of the player or object over the live event display, adjusting display of the overlaid projected path during the play in the live event; and displaying an output of the path wager.

BRIEF DESCRIPTIONS OF THE DRAWINGS

The accompanying drawings illustrate various embodiments of systems, methods, and various other aspects. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 illustrates a current wager database, according to an embodiment.

DETAILED DESCRIPTION

Figure 1:
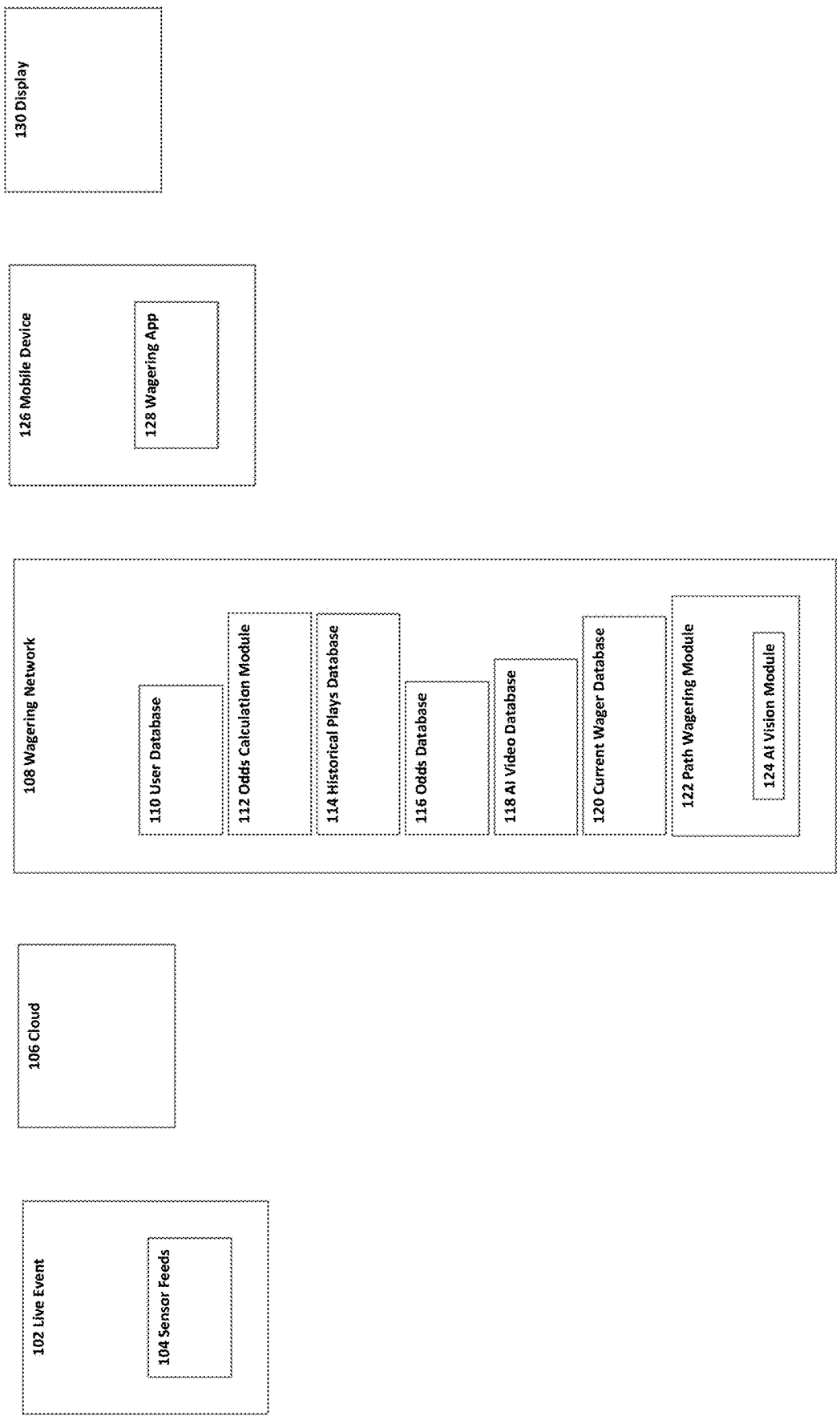
FIG. 1 illustrates an AI based path wagering, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an AI-based path wagering. This system may include a live event 102, for example a sporting event such as a football game, basketball game, baseball game, hockey game, tennis match, golf tournament, eSports, or digital game, etc. The live event 102 will include some number of actions or plays, upon with a user or bettor or customer can place a bet or wager, typically through an entity called a sportsbook. There are numerous types of wagers the bettor can make, including, but not limited to, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the bettor to buy points to move the point spread off of the opening line; this will increase the price of the bet, sometimes by increasing the "juice", "vig", or hold that the sportsbook takes. Another type of wager the bettor can make is an over/under, in which the user bets over or under a total for the live event 102, such as the score of an American football game or the run line in baseball, or a series of plays in the live event 102. Sportsbooks have a number of bets they can handle, which can be a limit of wagers they can take on either side of a bet before they will move the line or odds off of the opening line. Additionally, there are circumstances, such as an injury to an important player (such as a listed pitcher), in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events in the future. Sportsbooks further need to offer payment processing services in order to cash out customers. This can be done at kiosks at the live event 102 or at another location.

Further, a plurality of sensors 104 that may be used such as motion sensors, temperature sensors, humidity sensors, cameras such as an RGB-D Camera which is a digital camera capturing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play, and the like. Imaging devices may also be used as tracking devices such as player tracking that compiles statistical information through real-time X, Y positioning of players and X, Y, Z positioning of the ball. In this embodiment only the video feed is used, but in other embodiments additional sensor data can be used to augment the accuracy of the probabilistic engine (See, eg., Memory Augmented Deep Generative models for Forecasting the Next Shot Location in Tennis, Fernando et. Al, which is incorporated by reference herein in its entirety).

Further, a cloud 106 or communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques known in the art. The communication network may allow ubiquitous access to shared pools of configurable system resources and higher-level services that can be rapidly provisioned with minimal management effort, often over the Internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to wagering network 108 which may perform real time analysis on the type of play and the result of the play. The cloud 106 may also be synchronized with game situational data, such as the time of the game, the score, location on the field, weather conditions, and the like, which may affect the choice of play utilized. For example, in other exemplary embodiments, the cloud 106 may not receive data gathered from sensors and may, instead, receive data from an alternative data feed, such as SPORTRADAR. This data may be compiled substantially immediately following the completion of any play and the data from this feed may be compared with a variety of team data and league data based on a variety of elements, including down, possession, score, time, team, and so forth, as described in various exemplary embodiments herein.

In a further embodiment, a wagering network 108, may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, wagering network 108 may not receive data gathered from sensors and may, instead, receive data from an alternative data feed, such as SPORTRADAR. This data may be compiled substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can create engaging promotions to the user.

Further, an embodiment may utilize a user database 110 which contains data relevant to all users of the system, which may include a user ID, a device identifier, a paired device identifier, wagering history, and wallet information, among other information, for the user.

Further, the embodiments can utilize an odds calculation module 112 which utilizes historical play data to calculate odds for in-play wagers.

Further, a historical plays database 114 that contains play data for the type of sport being played in live sporting event 102 may be utilized in the embodiment. For example, in American Football, for optimal odds calculation, the historical play data should include meta data about the historical plays, such as but not limited to, time, location, weather, previous plays, opponent, physiological data, etc.

Further, embodiments may utilize an odds database 116 that contains the odds calculated by the odds calculation module 112. The odds database is used for reference by the path wagering module 122 to display the odds on either the user's mobile device 126 or a secondary display 130, and to take bets from the user through the mobile device 126 wagering app 128. The embodiments may also include an AI video database 118 that stores historical video of players involved in the current live event 102, and that is used by the AI vision module 124, to predict the path of a player or object in the field of play. In an example where the user is wagering on the path of a pass catcher in an American football game, the database will have video of the potential pass catchers running routes in past games, or past plays from the current live event 102. The AI vision module 124, for example such as the tennis shot predictor described in Memory Augmented Deep Generative models for Forecasting Next Shot Location in Tennis (Fernando et al.) will then use this data to identify similar movements in the live event video feed to predict the path the pass catcher will take. Further, in the embodiments, it may be understood that only certain players in a live event may be subject to path wagers. In the example above, potential pass catchers are used. A further example could use both path catchers and running backs, but may exclude other players, for example offensive linemen, as desired.

Further, a current wager database 120 that stores the wagers made on the current play in the live event 102, to be used by the AI vision module 124 to adjust the display of the live event 102 on either the user's mobile device 126 or a secondary display 130.

Further, a path wagering module 122 then displays available wagers from the odds database 116 on either the user's mobile device 126 or their display 130. Next, a wager can be collected from the user and recorded in the current wager database 120. The recording of the wager in the current wager database 120 can prompt the AI vision module 124 to adjust the display of the live event 102 to include the user's wagered upon path as well as the predicted path, with the predicted path changing in appearance to indicate the level of confidence the AI has in the predicted path, and monitor for the completion of the play. Once the play is completed, the path wagering module 122 compares the actual result of the play to the wagered upon result and updates the account balance of the user in the user database 110. This continues for every play until the live event 102 is over, the user closes the wagering app 128, or some other action is taken where further updates are not necessary.

Further, in some embodiments the AI vision module 124 compares video of the live event 102 to historical video in the AI video database 118 in order to project the path of a player or object in the field of play. In this example, the module is projecting the route of potential pass catchers in an American football game, for example a post route, go route, out route, wheel route, etc. The projected route is overlaid on live event 102 video on the display 130 or mobile device 126 of the user as the projected route and the module's confidence in its prediction change. This continues to loop until the play is completed, at which point the path wagering module 122 is prompted by the AI vision module 124.

Further, a mobile device 126, such as a computing device, laptop, smartphone, tablet, computer, smart speaker, or other I/O devices, may be utilized as a wagering platform. I/O devices may be present in the computing device. Input devices for inputting data or wagers may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors, and the like. Output devices, which may be used to output data to a user, may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices are capable of facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also offer storage and/or an installation medium for the computing device. In still other embodiments, the computing device may offer USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In the embodiments the user device could be an optional component and would be utilized in a situation in which the paired wearable device is utilizing the user device as additional memory or computing power or connection to the internet.

Further, a wagering app 128, which is a program that enables the user to place bets on individual plays in the live event 102, as well as display the audio and video from the live event 102, along with the available wagers, and path overlays, on either the user's mobile device 126 or their display 130. The wagering app 128 allows the user to interact with the wagering network 108 in order to place bets and transact funds based on wager outcomes.

Further, a display, such as a television, smartphone, tablet, gaming system, etc., on which the live event 102, along with the available wagers, and path overlays can be displayed, may be utilized.

FIG. 2 provides an illustration of the current wager database 120. The database contains current wagers made through the mobile device 126 wagering app 128 that have not yet been resolved. For example, in an embodiment of an American football game between the Chicago Bears and the Green Bay Packers, three users have made a wager on the 67th play of the game, the Packers have the ball on the Bears' 40 yard line, and it is 3rd down and 7 with 5:15 remaining in the fourth quarter. Each user has inputted an indication that the next play will be a passing play and have utilized the path wagering module 122 to wager on the exact route a player will run on the pass play. User Joe Smith believes the wide receiver number 88 will run an out route, in which the receiver runs straight down the field for a distance then makes a right angle turn towards the sideline. The wagering network 108 is offering +250 odds on this outcome, meaning if user Joe Smith wins his $10 bet, he will be paid back $25. User Frank Jones also believes the play will result in a pass to wide receiver number 88 but thinks that the receiver will run a post route, in which a receiver runs straight down the field towards the goalpost. User Frank Jones wagered $50 on this outcome at +120 odds, meaning he will win $60 if the actual play results match his wager. User Susan Robinson also believes the play will be a pass, but is wagering that it will be a wheel route, in which the player runs out of the backfield towards the sideline and then turns upfield to receive the pass, run by the running back number 23. The +300 odds on this outcome indicate that user Susan Robinson will be paid out $300 if the actual outcome matches her wager. Once a play is completed and the result of the play is compared to all current wagers, the account balance of each user who wagered on the play is updated based on the result of the play, the user's wager and the odds on that wager. The database content is then cleared or archived in a database of prior wagers that is kept for auditing purposes.

Figure 3:
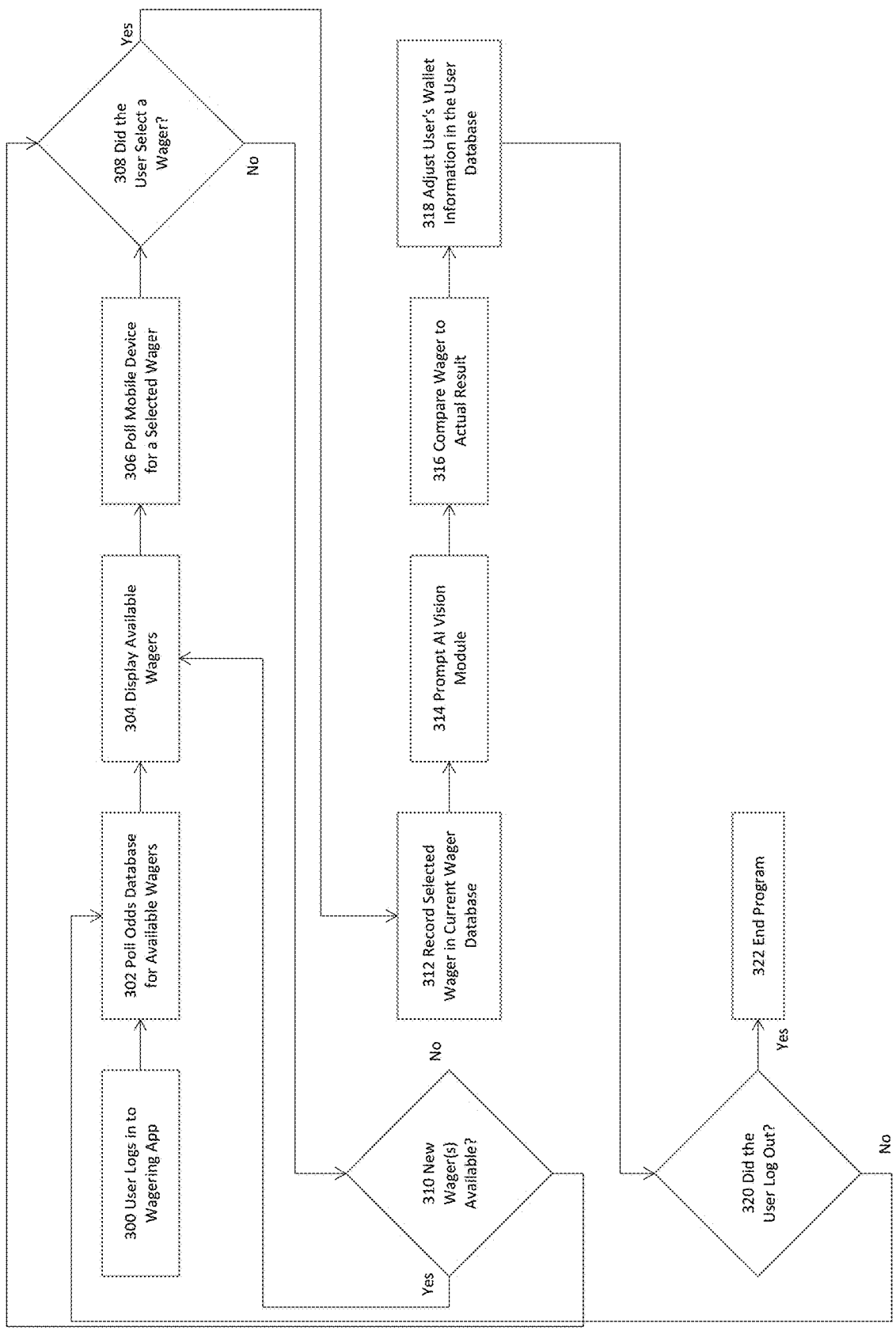
FIG. 3 illustrates a path wagering module, according to an embodiment.

FIG. 3 provides an illustration that displays the path wagering module 122. The process begins with the user logging into the wagering app 128 on a mobile device 126. Depending upon the embodiment, the user may, at this step, select the game they wish to wager on. This could be utilized, for example, when the user is both wagering and watching the live event 102 on the mobile device 126. In another embodiment the user could be watching the live event 102 on a display 130 that is separate from the mobile device 126, such as a television. In that embodiment the odds displayed would be based upon the live event 102 being displayed on the display 130. That embodiment could rely on the user's mobile device 126 being paired with the television or a set top box, or internet TV device attached to that television. In both of these embodiments the live event 102 the user is watching is identified to the wagering network 108, at step 300. The odds database 116 is then queried for all currently available wagers on the identified live event 102, which, in this example, is an American football game between the Chicago Bears and the Green Bay Packers, at step 302. The available wagers retrieved from the odds database 116 are then displayed to the user on either their mobile device 126 or another display 130. In this example, on the 67th play of the game, there are a number of different available wagers, including whether the play will be a run or a pass, how many yards the play will go for, if there will be a turnover, etc., but also wagers on the paths of certain players. In one embodiment, the user could select to wager on a pass. The module will then display available path wagers on specific players, such as the wide receiver number 88 running an out route or a post route. Alternatively, all wagers could be displayed on the first screen and allow the user to wager directly on the out route by wide receiver number 88, without having to first select that they wish to wager on a pass play. How this is configured could be based upon wagering network 108 administrator preferences, user preferences, or constraints of the display 130 or mobile device 126, at step 304. The mobile device 126 is then polled for the user selection of one of the displayed wagers that they wish to bet upon, at step 306. The module then determines if the user has selected to make a wager on this play. This continues until the play is started, at step 308. If the user has not selected a wager, the module polls the odds database 116 for new available wagers, at step 310. The module will return to step 304 to display the new available wagers. If the user has selected a wager, that wager is recorded in the current wager database 120, at step 312. Once the wager is recorded, the AI vision module 124 is prompted to monitor the live event 102 feed in order to predict the player's, or in other embodiments the ball's, path through the field of play. As the module becomes more confident in the path of the player or ball, the display of the predicted route will change. For example, user Joe Smith wagered $10 that Packer's wide receiver number 88 will run an out route on the current 3rd down and 7 on the Bears 35 yard line, with 5:15 to go in the 3rd quarter, with the Bears leading 10-7. The AI vision module 124 will monitor the movements of wide receiver number 88 during the play and calculate the probable path he will take. The user's wagered upon path is displayed over the live event 102 feed and the AI vision module's 124 predicted route is also overlaid on the live event 102 feed. Based on the AI vision module's 124 confidence in the predicted path, or distance from the wagered upon route, the color or gradient of the predicted path display will change. For example, when the offensive players are in the huddle, a large number of potential routes could be run by a wide receiver. The formation the offense takes, positioning and posture of the players, along with any pre-snap movement can be utilized by the AI to recalculate its confidence in the potential routes of the wide receiver. Such as the wide receiver lining up wide would make it unlikely that he would then run a wheel route, which typically starts in the backfield. As players move leading up to the snap, the AI's confidence in the variety of potential outcomes will change. As more movement data is collected the AI's confidence in certain outcomes will increase. In this example the wide receiver's position at the snap made some outcomes less likely. As the play develops more player movement data is available for the AI to utilize in its calculations. The receiver's initial movement off the line, his first step direction and speed, make it less likely that he will run a slant route. As he continues downfield the movement and angle of his hips could be analyzed looking for a tilt of the hips that indicate the receiver is about to pivot to an out route. The lack of that hip tilt would make the AI more confident in the post or go routes over the out route. In one embodiment, the user's wagered upon route is overlaid on the screen, along with some number of other potential routes the receiver might run. The display of the other routes will change as the AI's confidence in each route changes. As the AI collects more data and becomes more confident that the receiver is running the out route, the display of that route will continue to darken while the representation of other routes becomes lighter as the AI's confidence in those routes declines. Once the play is completed the AI vision module 124 will return to the path wagering module 122, at step 314. Once the AI vision module 124 is complete, the actual result of the play, in this example the out route run by wide receiver number 88, is compared to the user's wager, at step 316. The user's wallet balance is then updated based on the wager comparison with the actual result. In this example, user Frank Jones's account balance will increase by $25 ($10 wager with +250 odds), while user Joe Smith ($50) and user Susan Robinson ($100) have their account balance decrease by their wager amount, at step 318. The module then determines if the user has logged out of the wagering app 128, at step 320. If the user has not logged out of the wagering app 128, the module returns to step 302. If the user has logged out of the wagering app 128, the program ends, at step 322.

Figure 4:
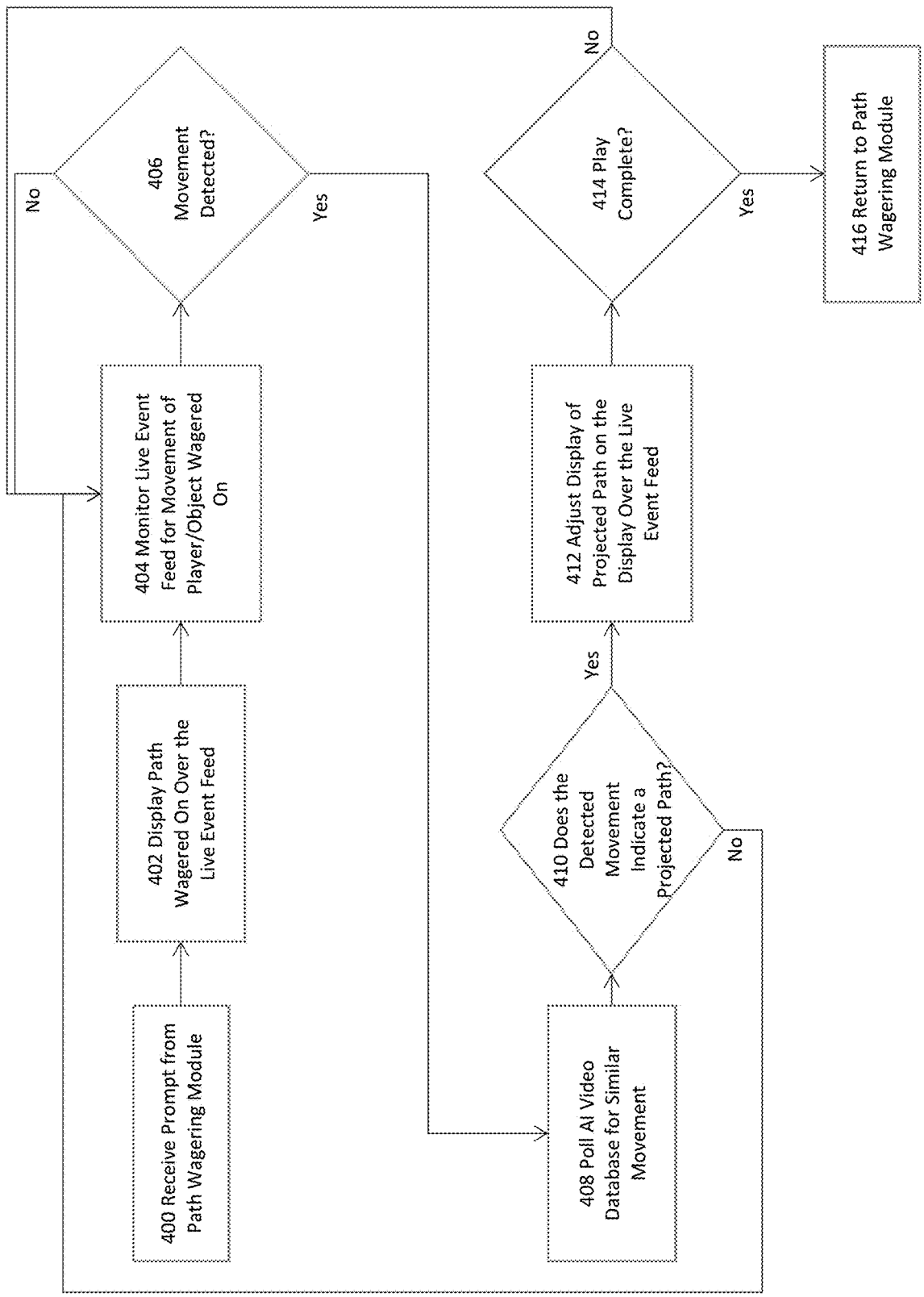
FIG. 4 illustrates an AI vision module, according to an embodiment.

FIG. 4 provides an illustration of the AI vision module 124. The process begins with the receiving of a prompt from the path wagering module 122 that indicates the user has selected a wager on the path of a player or object, such as the ball, or puck, through the field of play during a play or event inside of the live event 102, at step 400. In this example three users, Joe Smith, Frank Jones, and Susan Robinson, have all made wagers on the path of a potential pass catcher on the 67th play between the Chicago Bears and the Green Bay Packers. User Joe Smith and user Frank Jones both wagered that the pass would go to wide receiver number 88, with user Joe Smith wagering on an out route as the receiver's path, and user Frank Jones waging on a post route. User Susan Robinson wagered on the pass going to a different player, running back number 23, with that pass catcher running a wheel route. The live event 102 feed to each user is adjusted to include an overlay of the path they wagered upon, at step 402. The sensor feed, and, in this embodiment, the video feed, from the live event 102 is monitored for movement of the player or object that is being wagered upon, at step 404. In this embodiment, that is both Green Bay wide receiver number 88 and Green Bay running back number 23. The module will then either proceed to step 408 or return to step 404 based on the detection of movement or the detection of no movement, at step 406. If no movement is detected, the module returns to step 404. If movement of at least one of the players wagered upon is detected, the module compares that movement to video of that player in past plays in the AI video database 118, at step 408. At this point, the module relies on one of a number of artificial intelligence based systems for predicting the route of a player or ball through a field of play based on video analysis of the current play compared to a database of previous video. In this example the AI will examine the movements of the potential pass catchers, wide receiver number 88 and running back number 23, and compare those movements to video of the same player in similar plays in the past, in order to predict where they will travel. These movements could be large scale movements, such as the player's physical position on the field as they run, and they could also be small scale movements such as, the tilt of their shoulders, angle of their hips, focus of their gaze, etc., depending upon the specific algorithm of the AI used. The movement detected is processed by the AI to determine if the detected movement indicates a projected path for the player or object, at step 410. If the path does not indicate a projected path, for example the first move of the player at the snap of the ball does not eliminate enough possible paths for the AI to make a projection with a high confidence, the module returns to step 404. If the movement detected does indicate a projected path, that path is overlaid on the user's display 130 or mobile device 126, at step 412. Until the play is complete the module will keep cycling back to step 404 in order to get the most up to date projected path with the highest confidence level until the play is completed. The projected path that is overlaid on the user's display 130 or mobile device 126 changes as these cycles are run. If the projected path changes, then the overlaid path changes. If the confidence level of the projection changes, then the color, shade, or gradient of the projected path changes. For example, the module is monitoring wide receiver number 88 and, at the snap, begins running forward away from the line of scrimmage. At this point there are a number of different routes the receiver could possibly run. If this particular receiver was primarily a deep threat, the module may be able to project that the receiver is running a fly pattern or post route and begin to overlay that route on the user's display 130 or mobile device 126. If the receiver is more versatile, the module may not be able to make a projection until more data is collected. Once the module has a projected path, and it is overlaid on the display 130, the presentation of that path will change based on the confidence level of the AI in the projection. If the receiver runs forward, and the AI is equally confident in a post route, fly pattern or out route, the AI can eliminate the slant route from its list of potential paths. With three equal options, it could either display none of these routes as predictions, or, in other embodiments, it could display all three. As the receiver progresses down field, the AI becomes more confident in the out route as its projection. The other two routes fall off the display overlay, and the out pattern begins to get bolder on the display 130, or changes color to indicate the AI in gaining confidence in its prediction. This continues until the play is complete, at step 414. Once the play is complete the AI vision module 124 sends a prompt, at step 416 to the path wagering module 122.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for wagering on the path of a player or object in the field of play during a single play of a live event and displaying a probabilistic outcome over video of the live event, comprising:
   retrieving at least one active live event upon which wagers can be placed on plays occurring inside of that live event;
   presenting at least one wagering option on a play occurring inside of the live event;
   selecting a path of at least one player or object in a field of play inside the live event for making at least one wager;
   making a path wager on the selected path;
   displaying the selected path over a display of the live event;
   comparing movement of players and/or objects in the field of play to historical video of the same players in similar plays from at least one of one or more previous live events and previous movements of the players in the current live event;
   determining a projected path of the player and/or object;
   overlaying the projected path of the player and/or object over the live event display; and
   adjusting display of the overlaid projected path based on a confidence in the projection.

2. The method of claim 1, further comprising triggering the presenting of at least one wagering option on a play occurring inside of the live event through detection of movement of at least one player inside the live event.

3. The method of claim 1, wherein the at least one player who is the basis for the path wager is at least one or more players selected from a predetermined group of players.

4. The method of claim 3, wherein the predetermined group of players is based on the type of live event.

5. The method of claim 1, wherein one or more path wagers are presented as the at least one wagering option on a play occurring inside of the live event and the one or more path wagers are determined by artificial intelligence.

6. The method of claim 1, wherein the determination of whether a path wager was successful is based on a difference between the actual path taken and the path wager, wherein the path wager is successful if the difference between the actual path taken and the path wager is less than a threshold value.

7. The method of claim 1, wherein the confidence of the projection is adjusted during a play in the live event.

8. The method of claim 1, wherein the adjustment of the display of the overlaid path includes at least one of varying the color, shade, and gradient of the overlaid projected path.

9. A computer implemented method for wagering on the path of a player or object in the field of play during a single play of a live event, comprising executing on a processor the steps of:
   displaying at least one active live event upon which wagers can be placed on plays occurring inside of that live event;
   displaying at least one wagering option on a play occurring inside of the live event;
   displaying a path, on an interface, of at least one player or object in a field of play inside the live event for making at least one wager;
   displaying a path wager placed on the selected path;
   displaying the user selected path over a display of the live event;
   overlaying a projected path of the player or object over the live event display;
   adjusting display of the overlaid projected path during the play in the live event; and
   displaying an output of the path wager.

10. The computer implemented method of claim 9, further comprising displaying a plurality of path wager options.

11. The computer implemented method of claim 9, further comprising displaying a plurality of path wager options for each of the at least one player and/or object.

12. The computer implemented method of claim 9, wherein the adjusting of the display of the overlaid projected path during the play comprises at least one of changing color, shade and gradient of the overlaid path.

13. The computer implemented method of claim 9, further comprising overlaying a plurality of projected paths of the player or object over the live event display.

14. The computer implemented method of claim 13, further comprising removing all but one of the plurality of projected paths of the player or object from the live event display during the display of the play.

\* \* \* \* \*